United States Patent [19]
Marche

[11] Patent Number: 4,829,464
[45] Date of Patent: May 9, 1989

[54] ARRANGEMENT FOR FILTERING A MULTIPLEXED VIDEO SIGNAL

[75] Inventor: Pierre Marche, Boulogne, France

[73] Assignee: U.S. Philips Corp., New York, N.Y.

[21] Appl. No.: 18,565

[22] Filed: Feb. 25, 1987

[30] Foreign Application Priority Data

Feb. 25, 1986 [FR] France ................................ 86 02570

[51] Int. Cl.$^4$ ............................................. G06F 15/31
[52] U.S. Cl. ............................................... 364/724.07
[58] Field of Search ............. 364/724, 724.01, 724.07, 364/724.16; 358/113, 140

[56] References Cited

U.S. PATENT DOCUMENTS

| 4,217,608 | 8/1980 | MacGregor et al. | 358/113 |
| 4,348,693 | 9/1982 | Cauldwell | 358/140 |
| 4,477,834 | 10/1984 | Beaumont et al. | 358/113 |
| 4,551,752 | 11/1985 | Wall et al. | 358/113 |
| 4,582,065 | 4/1986 | Adams | 358/140 |
| 4,618,892 | 10/1986 | Kawaguchi | 358/113 |
| 4,668,866 | 5/1987 | Kornfield | 358/113 |
| 4,727,506 | 2/1988 | Fling | 364/724 |

Primary Examiner—Gary V. Harkcom
Assistant Examiner—Dale M. Shaw
Attorney, Agent, or Firm—William L. Botjer

[57] ABSTRACT

Arrangement for cancelling spurious signals inherent to a multiplexed video signal, comprising an arrangement of random access memories ("1"), ("2"), and ("3") and adders (AD1, 2 and 3) and having for its object to obtain by a digital signal processing operation the average value ($\overline{Y}$) of the previously stored data contained in a certain section of the picture element for subtracting it from the information (Y) supplied by the picture element being analyzed. The transfer function of said processing operation has for its expression:

$$H(z) = 1 - \frac{1}{n} \sum_{k=k_0}^{n+k_0-1} z^{-k}$$

where
n = 2, 4, 8, 16, 32, 64
$k_0$ = 0, 1 or 2 for the actual arrangement.

1 Claim, 3 Drawing Sheets

ARRANGEMENT FOR FILTERING A MULTIPLEXED VIDEO SIGNAL

BACKGROUND OF THE INVENTION

The invention relates to an arrangement for cancelling spurious signals inherent to a multiplexed video signal occurring at an output of a detector formed by a linear array of elements arranged along the same line and effecting scanning of the scene, said signal first being amplified and thereafter converted into the digital form for processing the picture and finally being reconverted into the analog form.

This arrangement is, for example, used in new-generation infrared detectors.

These detectors are constituted by IR sensors which are coupled to charge transfer devices or similar devices. Thus, the function of converting the incident flux into an electric signal and also the function of integrating currents and multiplexing them so as to form a serial video signal are realized at the outputs of these detectors.

The first generation detectors only performed the flux conversion function. Cancelling the spurious signals coming from these detectors is simply effected by adding a filtering capacitor to each detector element in the region of the preamplifier. The signal multiplexing operation is thereafter effected by means of appropriate circuits.

In the new-generation detectors one has no access to the basic information of each detector. The flux conversion and multiplexing functions are not separate functions. Consequently the signal at the output of the detector is no longer available in the same manner.

The useful signals obtained from scanning the scene in polar or rectanguluar coordinates now appear serially at the output of the detector and are modulated in a given frequency range. A spurious direct current, low-frequency frequency signal is superimposed on these useful signals and has to be cancelled, the spurious signal being the result of the response of the detector to the average temperature of the background or to the temperature of the arrangement of the objective, to electric offsets between the different channels and to the low-frequency noise of the integrating and multiplexing arrangement.

SUMMARY OF THE INVENTION

The arrangement according to the invention is intended to play a part comparable to that of the filtering capacitor provided between the detector and its preamplifier when a system of first-generation detectors is used, this capacitive coupling does not exit in new-generation, infrared detector systems.

It is not advisable to design such an arrangement, intended to cut the low frequencies in each channel, on the basis of a multiplexed signal originating from the series arrangement of n channels, in an analog form as this would require the following components:

n samplers-blocking means and their control systems for effecting demultiplexing of the serial video signal;

n analog filters (that is to say not less than n resistor-capacitor networks) for effecting the actual filtering operation; and n analog change-over switches and their control systems for multiplexing these n parallel paths before performing the analog-to-digital conversion.

As the demultiplexing operation necessary for processing each channel independently is easy to perform by digital techniques thanks to the use of memories, the arrangement according to the invention, is characterized, in that at the output of an analog-to-digital converter the circuit is provided with a first signal-shaping circuit followed by a first RAM memory which is addressed by the coordinates of each analysed picture element and functions as a shift register. The input data corresponding to the picture element is analysed being conveyed to an input terminal of the first memory which at the same time serves as the output terminal, said input data being simultaneously conveyed to first and second adders. The first adder also receiving from the shift register output terminal the change-of-sign information via an inverter to a different picture element shifted through n elements with respect to the element being analysed for producing the difference between said input and output data and the quotient of this difference by dividing by the n elements of said group. This quotient is conveyed to a third adder receiving from a second RAM memory the average value of the input data of the group of elements associated with the picture element preceding the element being analyzed for forming the average value of the input data of the group of elements associated with the element being analysed. The average value of the input data of the group of elements associated with the first analysed element being calculated and stored in said second memory during an initialisation phase. The average value supplied by the third adder being stored, after having been passed through a second signal-shaping circuit, in the second RAM memory for use in the calculation of the average value associated with the elements of the following group. The average value supplied by the third adder is conveyed to a third RAM memory which produces a certain delay which fixes the position of each n-element group relative to the picture element being analysed. The output of the third memory is connected, after the sign of the signal has been inverted, to a further input of the second adder which thus produces the difference between the value of the input data corresponding to the element being analysed and the average value of the information compounds of the group of n elements associated therewith, supplied by the third memory. This last-mentioned difference corresponding to the filtering operation being conveyed via a third signal-shaping circuit.

BRIEF DESCRIPTION OF THE INVENTION

The following description, given by way of example with reference to the accompanying drawings will make it better understood how the invention may be put into effect.

DETAILED DESCRIPTION OF THE DRAWINGS

Figure 1:
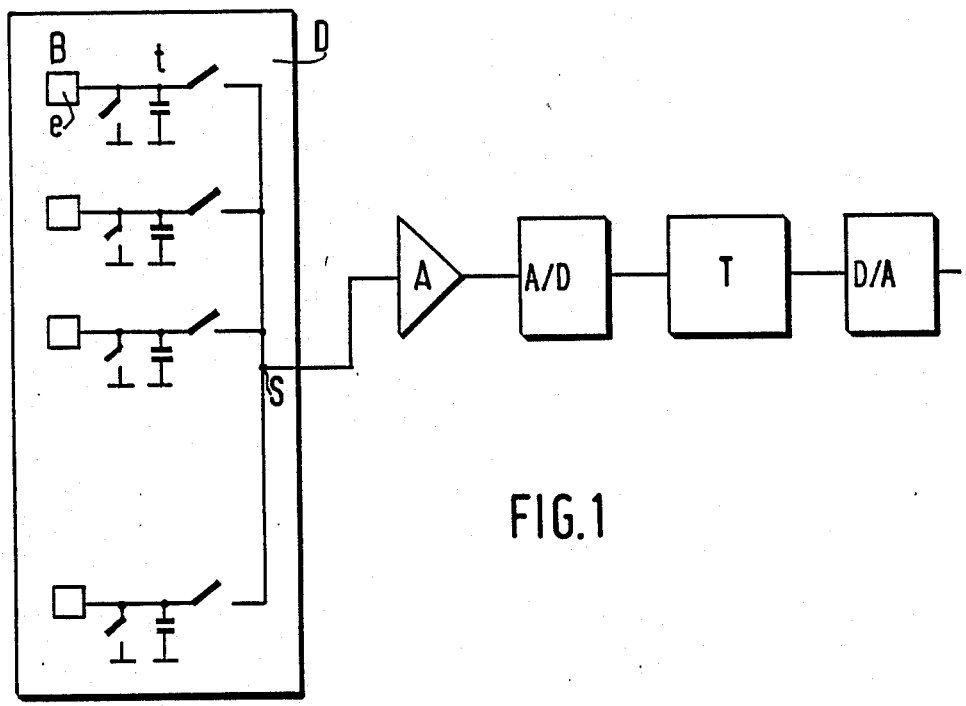
FIG. 1 shows the circuit diagram of a new-generation detector.

FIG. 1 shows the circuit diagram of an array of new-generation detectors comprising a linear array B of a detector elements e arranged along the same column.

Each of these detectors is coupled to a charge transfer device t or a similar device whose outputs are interconnected at S for transmitting a serial video signal. The array is contained in a "Dewar" barrel D. The analog signal appearing at the output S is amplified (A) and converted into the digital form (A/D). The digital signal is submitted to a processing operation (T) and thereafter can be submitted to a reconversion into the analog form (D/A).

Figure 2:
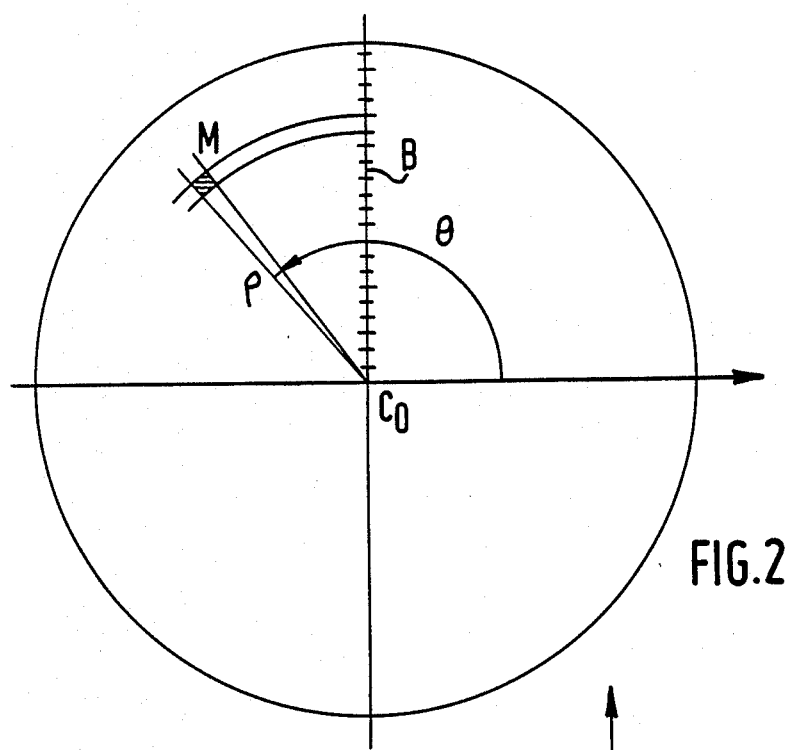
FIG. 2 shows a frame obtained by scanning the scene in polar coordinates.

Let it, for example, be assumed that scanning the scene is effected in polar coordinates. A complete analysis of the scene limits the field in accordance with the characteristics of an infrared auto-director. The image obtained in the focal plane of the objective forms a frame shown in FIG. 2. The detectors e are arranged in an n-element linear array B. A prism rotating at the level of the objective causes the picture to rotate in the plane of the scene. Thus, each detector element e analyses a circle having its centre at Co. The luminous flux it receives is integrated and read sequentially during a certain period of time, depending on the rotational speed, every $1/128^{th}$ turn. The frame which is thus divided into 128 consecutive positions of the linear array of detectors which itself is geographically split into n elements is assembled from 128 times n picture elements or pixels (a contraction of picture elements). One of these elements e is shown around point M of the polar coordinates $\rho$ and $\theta$. If the scanning rate is 200 t/s, the frame has a period of 5 ms. If n = 32 elements, the time interval between analysing two consecutive pixels is of the order of 1 microsecond.

The filter according to the invention is disposed at the output of the A/D converter. Its transfer function can be expressed as:

$$H(z) = 1 - \frac{1}{n} \sum_{k=k_o}^{n+k_0-1} z^{-k}$$

$$= 1 - \frac{1}{n} [z^{-k0} + z^{-(k0+1)} + \ldots + z^{-(n+k0-1)}]$$

where
n = 2, 4, 8, 6, 32 or 34 consecutive positions of the linear array of detectors,
$k_o$ = 0, 1 or 2
in which z represents a delay operator.

Let it be assumed that y(t) is the luminance level of the pixel analysed at an instant t.

If the operator z causes the value $y(t+n\tau)$ to correspond to $z^n$, the transform H applied to y(t) generates a function u(t) such as:

$$y(t) \xrightarrow{H} u(t) = y(t) - \frac{1}{n} \cdot \{y(t - k_0\tau) +$$

$$y[t - (k_0 + 1)\tau] + \ldots + y[t - (n + k_o - 1)\tau\}$$

In this expression y(t) is the gross information of the luminous level of a pixel analysed at the instant t and including the information of the parasitic signals mentioned in the foregoing.

$y(t-k_o\tau)$, $y[t-(k_0+1)\tau]$, ..., $y[t-(k_0+n-1)\tau]$, represent the luminance levels of n pixels analysed at the respective instants $t-k_0\tau$, $t-(k_0+1)\tau$, ..., $t-(n+k_0-1)\tau$ and which also include the levels of the parasitic signals, $\tau$ being the time interval between the passages of two consecutive information components. When their sum is divided by n, the quotient represents the average value of the luminance level of n pixels, and subtracting this average value from the luminance value of the pixel analysed at the instant t results in a cancellation of the parasitic signals. The number $k_0$ determines the position of the group of previously analysed n pixels with respect to the pixel being analysed at the instant t.

Figure 3:
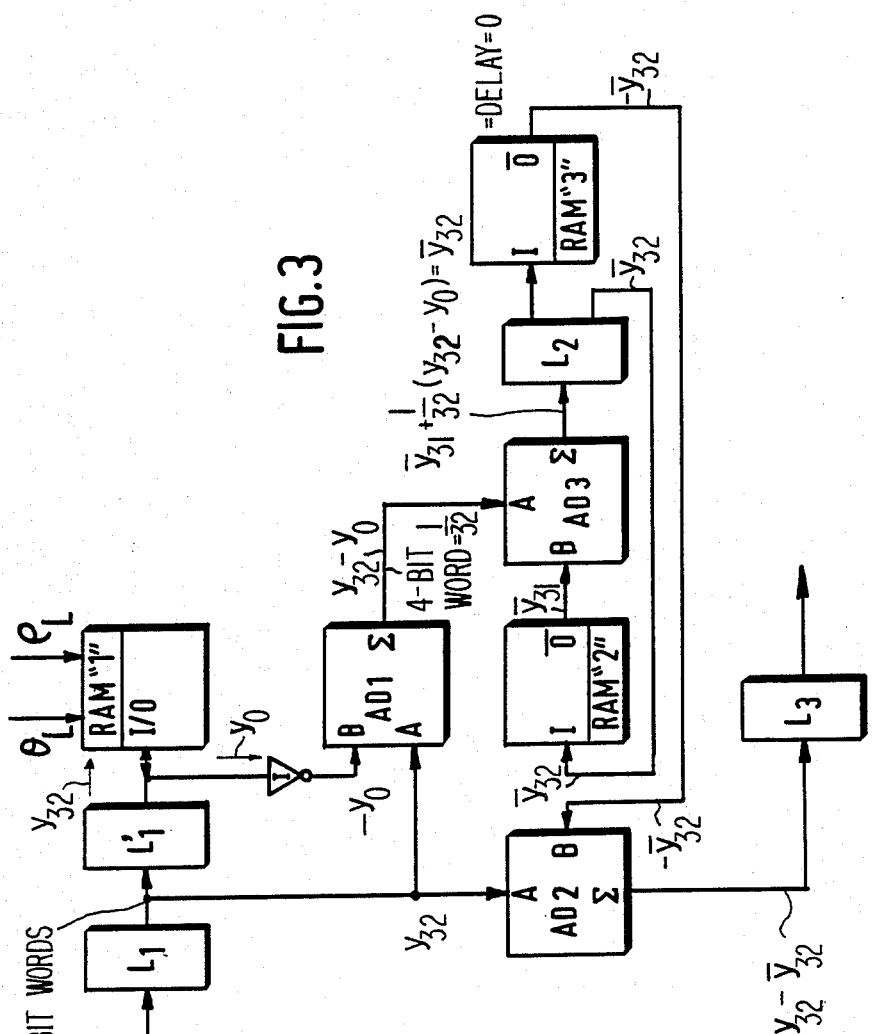
FIG. 3 shows the block circuit diagram of the filter according to the invention.

The block circuit diagram of the filter of the invention is shown in FIG. 3.

The coordinates $\theta$ and $\rho$ linked with the the scanning operation in polar coordinates ($\theta$ being the angular position of the linear array and $\rho$ the number of the detector), become $\theta_L$ and $\rho_L$ after reshaping of the signals.

Y (output A/D) represents a serial video message which at the output of the analog-to-digital converter is constituted by a series of 9-bit words which are the digitised signals of the luminance levels.

After having passed through the block $L_1$ which effects reshaping of the signals with the object of having them continue as long as possible and through the short circuit-protection block $L'_1$, the consecutive information components Y are conveyed to the memory block RAM "1" (Random Access Memory) which is addressed at $\theta_L$ and $\rho_L$ and is used as a delay line. This memory is formed by horizontally stacked shift registers, each stack corresponding to a number of the linear array of detectors ($\rho$) and each block of a register corresponding in the vertical direction to a position of $\theta$, but which shifts for effecting the transfer of information introduced at the inputs/outputs I/O which actually are the same terminals which serve to enter the input data and to output the output data. The values y of the luminance levels are arranged in the addresses $\rho_L$ and $\theta_L$, which are the coordinates of the analysed pixels. By means of the transfer mechanism of the shift registers, entering y(t) at the instant t is effected immediately after $y(t-n\tau)$ has been outputted. Thus, for each pixel analysed at an instant t, a group of consecutive information components corresponding to the same number of the detector ($\rho_L$) is preserved in the memory during the time interval n$\tau$.

During the time interval of the order of 1 $\mu$s between the analysis of two consecutive pixels, it is not possible to try and find n values in the memory, to take their average value and to subtract this average value from the value of the analysis being effected. Calculating the average value is effected non-recurrently in an initialisation stage on the group of pixels bounded by the values n and $k_0$.

Figure 4:
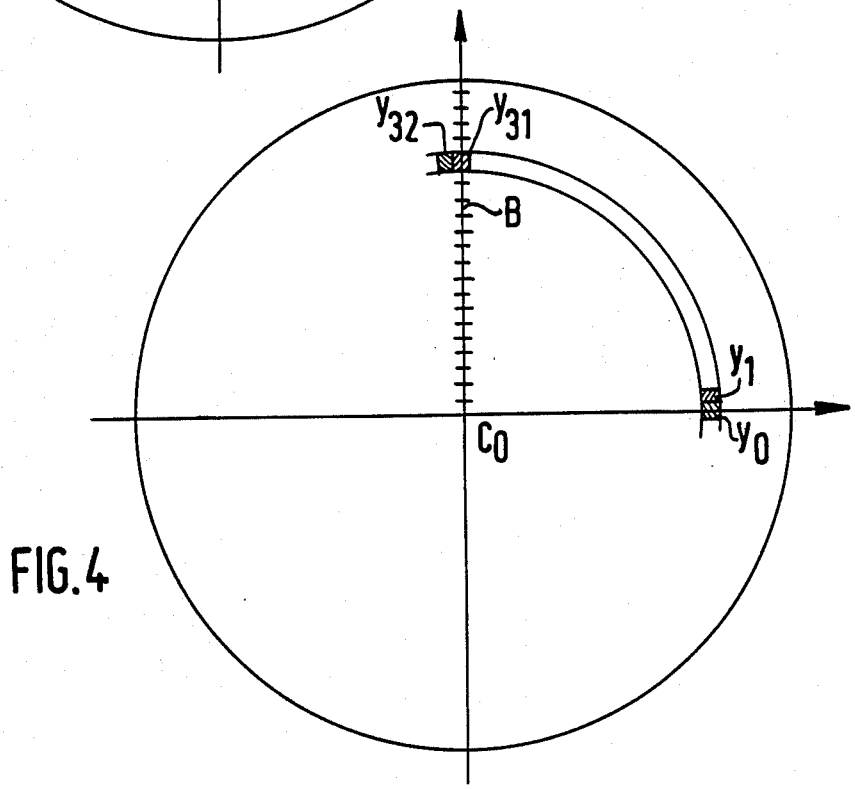
FIG. 4 shows a ring-shaped group of elements for a scanning operation in polar coordinates.

Let it, for example, be assumed that n = 32 and $k_0$ = 0. For a constant value of $\rho$ (detection number) FIG. 4 shows the section of the circle thus defined.

Between the positions 0 and 31 of the linear array, the average value of the luminance level of a detector has for its expression:

$$\overline{Y_{31}} = \frac{1}{32}(Y_0 + Y_1 + \ldots + Y_{31})$$

This average value calculated in the initialisation phase is stored in a RAM "2" memory.

For the pixel corresponding to the subsequent position of the linear array ($\theta$ = 32), the average value of the luminance level of the 32 preceding positions is written:

$$\overline{Y_{32}} = \frac{1}{32}(Y_1 + Y_2 + \ldots + Y_{32})$$

By taking the difference between these two average values, the following is obtained:

$$\overline{Y_{32}} - \overline{Y_{31}} = \frac{1}{32}(Y_{32} - Y_0)$$

This relation shows that calculating the average value $\overline{Y_{32}}$ is comparatively simple since only one single value $\overline{Y_{31}}$ must be retrieved from the memory instead of 32 values. The average value $\overline{Y_{32}}$ is thereafter stored in the RAM "2" in order to render it possible to calculate $\overline{Y_{33}}$ in a similar way, with the aid of the relation derived by repeating the procedure described in the foregoing:

$$\overline{Y_{33}} - \overline{Y_{32}} = \frac{1}{32}(Y_{33} - Y_1)$$

The shift registers of the RAM "1" are structured such that $Y_0$ is outputted from this memory to allow $Y_{32}$ to enter; similarly, analysing the subsequent pixels causes $Y_1$ to be outputted to allow $Y_{33}$ to enter, etc.

A further study of the block circuit diagram of the filter shows that $Y_0$ is switched via an inverter I to the input B of an adder (AD1), whose input A receives $Y_{32}$. Consequently, the value $Y_{32} - Y_0$ is present at the output of this adder. Dividing this value by 32, which simply consists in cancelling the five least significant bits is introduced at the inputs A of an adder (AD2), which receives at its inputs B the average value $\overline{Y_{31}}$ previously entered in the RAM "2" and therefore supplies from its outputs.

$$\overline{Y_{31}} + \frac{1}{32}(Y_{32} - Y_0)$$

which in fact is nothing else but the average value $\overline{Y_{32}}$. After having been reshaped in box $L_2$, $\overline{Y_{32}}$ is stored in RAM "2" for use during the calculation of $\overline{Y_{33}}$ and also in a RAM "3" memory which operates as a delay line (having zero delay for $k_0 = 0$) and from which it is outputted in the inverted form for transfer to the inputs B of the further adder (blocks AD2) which receives $\overline{Y_{32}}$ at its inputs A. Thus, the outputs $\Sigma$ of this adder supply $Y_{32} - \overline{Y_{32}}$, which is indeed the spurious signal filtering operation which is the object of this invention, reshaping the spurious signals being effected via a block $L_3$.

The above example describes the most simple case in which $k_0 = 0$, that is to say the information $Y_{32}$ arriving at the instant t is associated with the average value $\overline{Y_{32}}$ of the section consisting of 32 pixels, inclusive of the pixel being analysed at that instant.

If $k_0$ is chosen to be 1 or 2, the section of 32 pixels of which the average value is calculated is shifted through 1 or 2 pixels with respect to the information $Y_{32}$. Then the memory RAM "3" only performs its function as a delay line at the same time at which it effects the inversion of the average value.

The low-pass filter thus realizes, which has a slope of -6 dB/octave has a low cut-off frequency at -3 dB equal to fcb shown in the following Table, according to n and $k_0$ (fcb in Hz), within the scope of the example described in the foregoing.

| $k_0$ ↓ | n → | 2 | 4 | 8 | 16 | 32 | 64 |
|---|---|---|---|---|---|---|---|
| 0 | fcb → | 6500 | 2100 | 900 | 410 | 200 | 100 |
| 2 | fcb → | | | 550 | 320 | 170 | |

Analysing the scene may alternatively be effected in rectagular coordinates, handling the problem is then identical.

Furthermore, the coordinates of the analysed pixel are denoted by k and i ($k = \rho$ and $i = \theta$ for the above-considered case of an analysis in polar coordinates). Let y be the luminance level at the output of the analog-to-digital converter and $t_{k,i}$ the instant at which the point having the coordinates k, i is analysed. These coordinates, which have become $k_L$ and $i_L$ after recovery of the signals are the addresses of the memory RAM "1" (circuit diagram of FIG. 3), which performs the function of the delay line. This memory has a capacity of 2048 16-bit words, which capacity is fully used when n = 64 or partly used for n = 2, 4, 8, 16 or 32. During the first part of the cycle corresponding to the pixel having the coordinates k, i the luminous level of the point $k, i - n$ is read and during the second part the luminance of the point k, i is entered into the RAM "1".

The adders of block AD3 and the inverters of the block AD1 render it possible to calculate $Y_{k,i} - Y_{k,i-n} = \Delta_{k,i}$.

The RAM "2" which is fed back via the adders of the block AD3 and the reshaping cicuits of block $L_2$ contains at the address k,i (modulo n) the information which is extracted for adding thereto $\Delta_{k,i}$ in the second part of the pixel cycle k,i. Thus at the end of the pixel cycle k,i the output information of the block 7 corresponds to $$\Sigma_{k,i-1} = \sum_{j=1}^{n} Y_{k,i-j}$$

This informmation, divided by n is entered into the RAM "3" which performs the function of a delay line for generating $k_0$. In all cases this information is equal to the average value $\overline{Y_k}$ of n consecutive luminance levels at the same detector k.

The operation $n_{k,i} = Y_{k,i} - \overline{Y_k}$ is effected by means of the adders of the block AD2. The result of this calculation (differential luminance of the point k, i) is reshaped by means of the circuits of block $L_3$.

Triggering the arrangement can be effected automatically as soon as voltages are applied to it, or at each beginning of the acquisition cycle, for example.

In addition to the functions for which it has been provided, this filter:

a - has the advantage of effecting an LF filtering of the multiplexed signal and consequently to participate in the cancellation of the LF noise of the charge transfer device (CCD).

b - is released of the task of correcting non-uniformities of the detectors and of the CCD which become apparent as offsets (when systematic offsets caused by the response of the detectors excited by a photonic flux through different solid angles or "electric" offsets of different channels of the CCD are concerned).

Thus, only the correction of non-uniformities in the response of the IR sensor coupled to the CCD must be made.

c - causes an increase in noise which can be assumed to be $(1+1/n)^{\frac{1}{2}}$ or +0.13 dB for n=32), which can be totally neglected.

What is claimed is:

1. Circuitry for cancelling spurious signals in a multiplexed video signal at the output of a detector formed by an array of elements arranged to effect scanning of a scene, said signal being first amplified and converted into digital form for processing the signal and thereafter reconverted into analog form, said circuitry being disposed at the output of analog-to-digital conversion circuitry and comprising:

a first RAM memory, said first RAM memory being addressed in coordinates corresponding to the picture element being analyzed and functioning as a shift register, the input data to said first RAM memory corresponding to the picture element being analyzed;

a first adder having first and second inputs said first input of said first adder receiving the input data as supplied to said first RAM memory, the second input of said first adder receiving via an inverter the change-of-sign information shifted through n elements with respect to the element to be analyzed to produce as an output the difference between said input and output data and the quotient of the difference by dividing the output by the n elements of said group;

a second adder having first and second inputs, said first input of said second adder receiving the input data;

a second RAM memory;

a third adder, said third adder receiving from said second RAM memory the average value of the input data of the group of elements associated with the picture element preceding the element being analyzed for generating the average value of the input data of the group of elements associated with the element being analyzed, the average value of the input data of the group elements associated with the first analyzed element being calculated and stored in said second RAM memory during an initialization procedure, the average values supplied by said third adder being input to the second RAM memory for use in the calculation of the average value associated with the elements of the following group; and a third RAM memory, said third RAM memory receiving the output of said third adder, said third RAM memory generating a predetermined delay which fixes the position of each n element group relative to the picture element being analyzed, the output of said third RAM memory being connected to the second input of the second adder which thereby generates the difference between the value of the input data corresponding to the element being analyzed and the average value of the information components of the group of n elements associated therewith supplied by the third memory, said difference corresponding to the spurious signal cancellation and being output from the circuit.

* * * * *